(12) United States Patent
Tanaka

(10) Patent No.: US 8,515,271 B2
(45) Date of Patent: Aug. 20, 2013

(54) IMAGING DEVICE, METHOD OF SELECTING IMAGING MODE, AND RECORDING MEDIUM CONFIGURED TO STORE COMPUTER PROGRAM

(75) Inventor: Toshiyuki Tanaka, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 13/196,047

(22) Filed: Aug. 2, 2011

(65) Prior Publication Data

US 2012/0051727 A1   Mar. 1, 2012

(30) Foreign Application Priority Data

Aug. 30, 2010 (JP) ................................. 2010-192582
Jun. 9, 2011 (KR) ......................... 10-2011-0055739

(51) Int. Cl.
*G03B 17/00* (2006.01)
(52) U.S. Cl.
USPC ........................................................... 396/49
(58) Field of Classification Search
USPC ........................................................... 396/49
See application file for complete search history.

(56) References Cited

U.S. PATENT DOCUMENTS

| | | | |
|---|---|---|---|
| 4,769,668 A * | 9/1988 | Ishikawa et al. | ................. 396/63 |
| 4,931,823 A | 6/1990 | Nakajima et al. | |
| 2010/0026875 A1 | 2/2010 | Shirai | |

FOREIGN PATENT DOCUMENTS

| | | |
|---|---|---|
| EP | 1 545 122 A1 | 6/2005 |
| JP | 2004-229244 A | 8/2004 |
| JP | 2006-074076 A | 3/2006 |
| JP | 2006-222579 A | 8/2006 |
| JP | 2007-074550 A | 3/2007 |
| JP | 2007-324965 A | 12/2007 |
| JP | 2009-159093 A | 7/2009 |
| JP | 2010-041244 A | 2/2010 |
| JP | 2010-109667 A | 5/2010 |

OTHER PUBLICATIONS

Search Report established for EP 11177440.2 (Dec. 23, 2011).

* cited by examiner

*Primary Examiner* — Rodney Fuller
(74) *Attorney, Agent, or Firm* — Drinker Biddle & Reath LLP

(57) ABSTRACT

An imaging device is capable of presenting a selectable imaging mode according to characteristics of a lens mounted thereon. The imaging device includes a plurality of imaging modes appropriate for capturing an image of a subject. The imaging device includes an imaging mode determiner and an imaging mode presenter. The imaging mode determiner determines one or more selectable imaging modes during mounting of a lens out of the plurality of imaging modes based on lens characteristics of the mounted lens. The imaging mode presenter presents the one or more selectable imaging modes determined by the imaging mode determiner on a screen.

20 Claims, 7 Drawing Sheets

IMAGING DEVICE, METHOD OF SELECTING IMAGING MODE, AND RECORDING MEDIUM CONFIGURED TO STORE COMPUTER PROGRAM

CROSS-REFERENCE TO RELATED PATENT APPLICATION

This application claims the priority benefit of Japanese Patent Application No. 2010-192582, filed on Aug. 30, 2010, in the Japanese Intellectual Property Office and Korean Patent Application No. 10-2011-0055739, filed on Jun. 9, 2011, in the Korean Intellectual Property Office, the disclosures of which are incorporated herein in their entirety by reference.

BACKGROUND

1. Field

Embodiments relate to an imaging device, a method of selecting an imaging mode, and a recording medium configured to store a computer program.

2. Description of the Related Art

A plurality of scene modes in which settings appropriate for capturing an image of a subject are previously determined may be mounted in an imaging device for capturing a still image or a moving image. Typical examples of the scene modes may be a portrait mode, a landscape mode, a close-up mode, a sports mode, a memorial picture mode, and a candle mode. In these scene modes, optimum set values may be previously determined to control characteristics related to definition, such as an optimum shutter speed, an iris effect, a hand-shake reduction effect, and a color gamut. A photographer may select an arbitrary scene out of a plurality of scenes according to an imaging state and be capable of capturing an image with settings corresponding to the selected scene.

In recent years, there has been an imaging device capable of not only allowing a photographer to select one out of prepared imaging modes, such as a scene mode or a focus mode, but also capable of analyzing a state of a subject and automatically determining the most appropriate imaging mode. In addition, recent imaging devices may have improved automatic determination performance and free a photographer from, inconveniently, having to spend time on deciding which imaging mode to select and having to manipulate a plurality of setting buttons or setting icons. In particular, an automatic scene selection function may be important to a beginner who is unfamiliar with capturing images.

SUMMARY

Embodiments include a new, improved imaging device, a method of selecting an imaging mode, and a non-transitory recording medium configured to store a computer program, in which a selectable imaging mode is presented and then a new imaging mode is also added or the presented imaging mode is deleted so that an imaging mode can be selected more effectively in a simple manner in consideration of characteristics of a lens mounted on the imaging device.

According to an embodiment, an imaging device includes a plurality of imaging modes appropriate for capturing an image of a subject. The imaging device includes an imaging mode determiner configured to determine one or more selectable imaging modes during mounting of a lens out of the plurality of imaging modes according to lens characteristics of the mounted lens, and an imaging mode presenter configured to present the one or more selectable imaging modes determined by the imaging mode determiner on a screen.

The imaging device having the above-described construction may determine the one or more selectable imaging modes during the mounting of the lens out of the plurality of imaging modes according to the lens characteristics of the mounted lens and effectively simplify selection of the imaging mode based on the lens characteristics.

The lens may be exchangeable, and the imaging mode determiner may obtain the lens characteristics of the mounted lens, discriminate the mounted lens from other lenses, and determine the one or more selectable imaging modes.

The imaging device may further include a memory unit configured to store information for uniquely discriminating the mounted lens and the one or more selectable imaging modes corresponding to the information.

The information for uniquely discriminating the mounted lens may include at least one piece of information for each of a plurality of lenses.

The information for uniquely discriminating the mounted lens may be a serial number.

Even if a lens having the same classification as other lenses is mounted, the imaging mode determiner may vary the one or more selectable imaging modes based on a difference in the information for uniquely discriminating the corresponding lens.

The one or more selectable imaging modes may include a scene mode in which an image of the subject is captured.

The one or more selectable imaging modes may include a mode of switching a focus-lens driving range of the lens. Also, the one or more selectable imaging modes may include a focus mode of switching between auto focusing and manual focusing.

The lens characteristics may include at least one of a classification of the lens, information regarding a focal distance, information regarding a distance to a subject, and information regarding a specific-operation switch unit.

The imaging mode determiner may add a selectable imaging mode or delete at least one of the determined one or more selectable imaging modes in response to a command to add a selectable imaging mode or delete at least one of the determined one or more selectable imaging modes.

In the above-described construction, the determined imaging mode may be added or deleted as a selectable imaging mode so that the imaging mode can be selected more effectively in a simple manner according to a photographer's taste.

According to another embodiment, a method of selecting an imaging mode of an imaging device including a plurality of imaging modes appropriate for capturing an image of a subject includes determining one or more selectable imaging modes out of the plurality of imaging modes according to lens characteristics of a mounted lens, and presenting the determined one or more selectable imaging modes on a screen.

The method may further include adding or deleting a selectable imaging mode to or from the presented one or more selectable imaging modes in response to an imaging mode addition or deletion command.

According to another embodiment, a non-transitory recording medium stores a computer program executable by a processor for performing a method of selecting an imaging mode of an imaging device including a plurality of imaging modes appropriate for capturing an image of a subject. The method includes determining one or more selectable imaging modes out of the plurality of imaging modes according to lens characteristics of a mounted lens, and presenting the determined one or more selectable imaging modes on a screen.

The method may further include adding or deleting a selectable imaging mode to or from the presented one or more selectable imaging modes.

BRIEF DESCRIPTION OF THE DRAWINGS

The above and other features and advantages will become more apparent by describing in detail exemplary embodiments with reference to the attached drawings in which.

DETAILED DESCRIPTION

Figure 1:
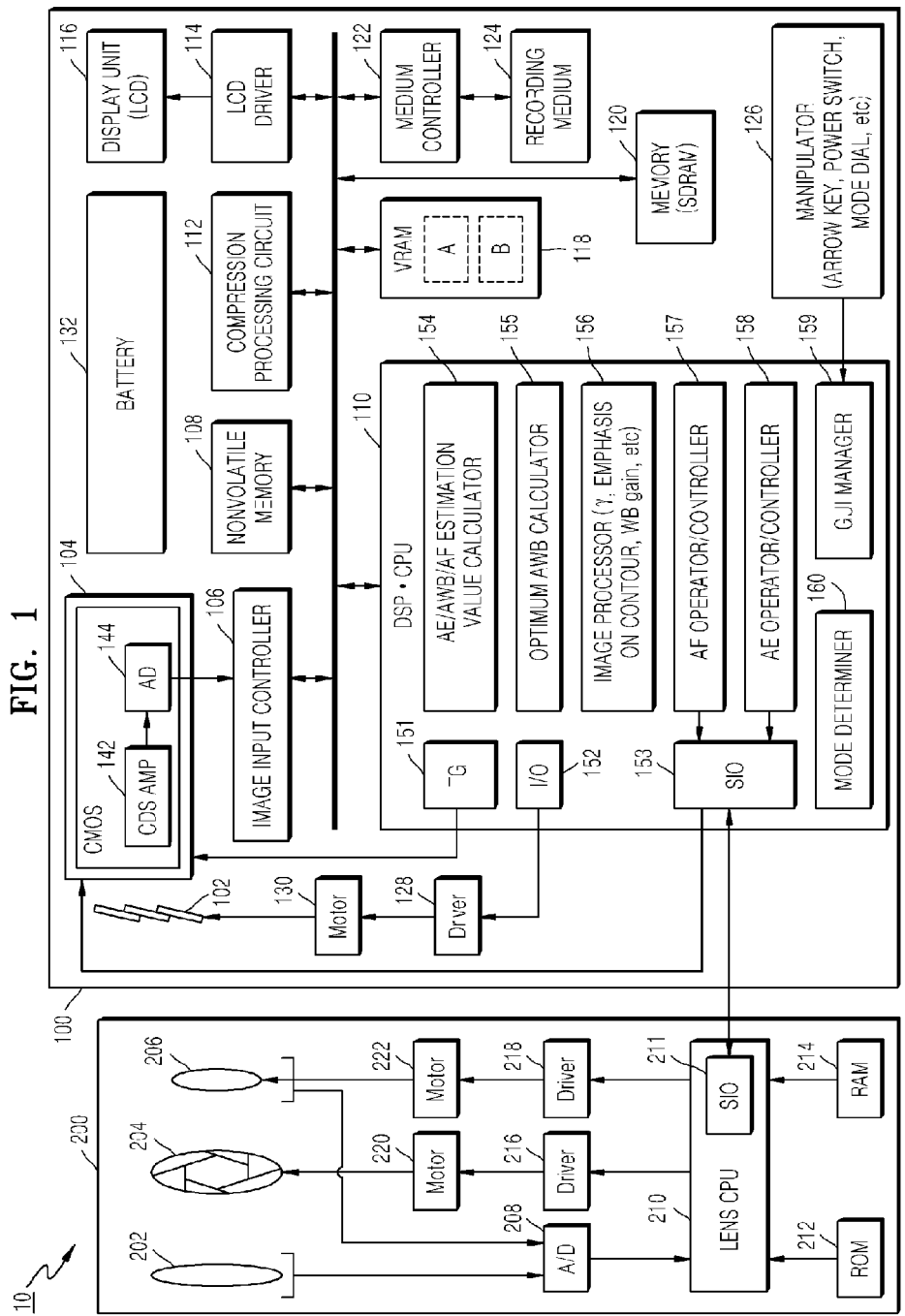
FIG. 1 is a diagram for explaining function configuration of an imaging device including a main body unit and a lens unit, according to an exemplary embodiment.

Embodiments will be described more fully hereinafter with reference to the accompanying drawings, in which exemplary embodiments are shown. In the specification and drawings, the same reference numerals are used to denote components having substantially the same functions, thus repeated description thereof will be omitted.

1. First Embodiment

[1-1. Function Configuration of Imaging Device]

Function configuration of an imaging device according to an exemplary embodiment will now be described with reference to the drawings. FIG. 1 is a diagram for explaining function configuration of an imaging device 10 including a main body unit 100 and a lens unit 200, according to an exemplary embodiment. Hereinafter, the function configuration of the imaging device 10 according to the present embodiment will be described with reference to FIG. 1.

The main body unit 100 may include a shutter 102, a complementary-metal-oxide-semiconductor (CMOS) image sensor 104, an image input controller 106, a nonvolatile memory 108, a digital signal processing/central processing unit (DSP/CPU) 110, a compression processing circuit 112, a liquid crystal display (LCD) driver 114, a display unit 116, a video random access memory (VRAM) 118, a memory 120, a media controller 122, a recording medium 124, a manipulator 126, a driver 128, a motor 130, and a battery 132.

In addition, the lens unit 200 may include a zoom lens 202, an iris 204, a focus lens 206, an analog-to-digital converter (ADC) 208, a lens CPU 210, a read-only memory (ROM) 212, a RAM 214, drivers 216 and 218, and motors 220 and 222.

To begin with, each component of the main body unit 100 will be described. The shutter 102 may adjust a time duration during which light from the lens unit 200 is incident on the CMOS image sensor 104. Although it is assumed in the present embodiment that the shutter 102 may be a mechanical shutter capable of adjusting a time duration during which light incidence is controlled to output an electric signal, the shutter 102 may be an electronic shutter capable of adjusting a time duration during which light incidence is controlled to output an electric signal.

The CMOS image sensor 104 may function to convert incident light from the lens unit 200 into an electric signal. The CMOS image sensor 104 may include a correlated double sampling (CDS) circuit 142 and an ADC 144. The CDS circuit 142 may be a circuit integrally including a CDS circuit configured to remove noise from an electric signal to be output by the CMOS image sensor 104 and an amplifier configured to amplify an electric signal from which noise is removed. Although it is assumed in the present embodiment that the imaging device 10 includes a circuit integrally including a CDS circuit and an amplifier, the imaging device 10 may include the CDS circuit and the amplifier separately. The ADC 144 may convert an electric signal generated by the CMOS image sensor 104 into a digital signal and generate raw data of an image.

The image input controller 106 may control input of raw data of an image generated by the ADC 144. The nonvolatile memory 108 may be where an execution program for controlling the imaging device 10 or management information required for controlling the imaging device 10 is recorded. As will be described in detail later, in the present embodiment, lens identification (ID) information required for identifying the lens unit 200 may be recorded in relation to information regarding scene modes selectable by the imaging device 10 when the lens unit 200 is mounted on the main body unit 100.

The DSP/CPU 110 may execute signal commands for the CMOS image sensor 104 or the CDS circuit 142 or execute manipulation commands according to a manipulation of the manipulator 126. Although FIG. 1 illustrates an integral-type DSP/CPU 110, signal commands and manipulation commands may be executed by separate controllers (e.g., a CPU and a DSP).

The DSP/CPU 110 may include a timing generator (TG) 151, an input/output (I/O) unit 152, a serial input/output interface (SIO) 153, an auto-exposure (AE)/auto-white-balance (AWB)/auto-focus (AF) estimation value calculator 154, an optimum AWB calculator 155, an image processor 156, an AF operator/controller 157, an AE operator/controller 158, a graphical user interface (GUI) manager 159, and a mode determiner 160.

The TG 151 may transmit a timing signal to the CMOS image sensor 104. A shutter speed may be determined according to a timing signal transmitted by the TG 151. That is, driving of the CMOS image sensor 104 may be controlled according to a timing signal transmitted by the TG 151, and image light from a subject may be incident on the CMOS image sensor 104 while the CMOS image sensor 104 is driven, and the electric signals for the image data are generated.

The I/O unit 152 may transmit control commands from the DSP/CPU 110 to the driver 128. The DSP/CPU 110 may transmit commands to open and close the shutter 102 to the driver 128 based on a photographer's manipulation of the manipulator 126.

The SIO 153 may control communication with the lens unit 200 or control a gain of an amplifier embedded in the CMOS image sensor 104.

The AE/AWB/AF estimation value calculator 154 may divide an image input by the CMOS image sensor 104 into a plurality of regions and calculate an amount of a characteristic (e.g., a luminance, an average RGB value, or a contrast value) of each block.

The optimum AWB calculator 155 may calculate an optimum white balance based on an average RGB value calculated by the AE/AWB/AF estimation value calculator 154 from an image input by the CMOS image sensor 104.

The image processor 156 may perform various processes on an image input by the CMOS image sensor 104, for example, a gamma adjusting operation, a contour adjusting operation, a white balance correction operation, and a gain adjusting operation.

The AF operator/controller 157 may evaluate an image contrast value calculated by the AE/AWB/AF estimation value calculator 154 and determine a moving direction and a speed of the focus lens 206 of the lens unit 200 to obtain a peak value of the image contrast value.

The AE operator/controller 158 may synthetically estimate a luminance of each block calculated by the AE/AWB/AF estimation value calculator 154 and determine an optimum shutter speed, iris value, and gain for a next image input operation (for a live-view image) and an imaging operation after release.

The GUI manager 159 may control an image or icon displayed on the display unit 116. Also, when the display unit 116 has a touch panel function, the GUI manager 159 may detect a photographer's manipulation and analyze and manage a signal.

The mode determiner 160 may determine an imaging mode (e.g., a scene mode) according to a classification of the lens unit 200 mounted on the main body unit 100 or determine the imaging mode based on a photographer's manipulation. When the mode determiner 160 determines, for example, a predetermined scene mode, the AE operator/controller 158 may determine an iris or shutter speed appropriate for the determined scene mode. The determination of an imaging mode in the mode determiner 160 will be described in detail later.

The compression processing circuit 112 may compress an image obtained by correcting a gain of a light quantity or adjusting a white balance into image data having an appropriate format. An image compression format may be a reversible or irreversible format. Examples of an appropriate format may be a joint photographic experts group (JPEG) format or a JPEG 2000 format.

The display unit 116 may display a live-view before manipulation is input to start/perform an imaging operation or display various setting screens of the imaging device 10 or captured images. The display unit 116 may display image data or various pieces of information regarding the imaging device 10 via the LCD driver 114.

The VRAM 118 may be a memory in which contents displayable on the display unit 116 are stored. A resolution or maximum chromatic number of the display unit 116 may depend on a capacity of the VRAM 118.

The memory 120 may temporarily store a captured image. The memory 120 may have such a memory capacity sufficient to store a plurality of images. Writing/reading of an image to/from the memory 120 may be controlled by the image input controller 106. The memory 120 may employ, for example, a synchronous dynamic RAM (SDRAM), as shown in FIG. 1.

The recording medium 124 may be a unit of the imaging device 10 in which a captured image is recorded. Input and output of a captured image to/from the recording medium 124 may be controlled by the media controller 122. The recording medium 124 may be a memory card, that is, a card-type memory device including a flash memory in which data is recorded.

Members for manipulating the imaging device 10 or determining various settings during an imaging operation may be disposed in the manipulator 126. The members disposed in the manipulator 126 may include a power button or switch, a mode dial, an arrow key, a cross key and a selection button for selecting an imaging mode, and a shutter button for initiating an operation of capturing an image of a subject.

The driver 128 may control driving of the motor 130 for operating the shutter 102. The battery 132 may store power and supply the power to the main body unit 100 or the lens unit 200.

Next, each component of the lens unit 200 will be described. The zoom lens 202 may move forward and backward along an optical axial direction to continuously vary a focal length thereof. Thus, the zoom lens 202 may allow a photographer to capture an image of a subject while varying a size of the subject. The iris 204 may control a quantity of light incident on the CMOS image sensor 104 of the main body unit 100 using the motor 220 during capturing of an image. The focus lens 206 may move forward and backward along the optical axial direction using the motor 222 and control a focus of the subject.

Although it is assumed in the present embodiment that only one zoom lens 202 and only one focus lens 206 are provided, at least two zoom lenses 202 and at least two focus lens 206 may be provided.

The ADC 208 may convert positional information regarding the zoom lens 202 and the focus lens 206 into digital information. The ADC 208 may transmit the digital information to the lens CPU 210.

The lens CPU 210 may control an internal operation of the lens unit 200 and information communication between the lens unit 200 and the main body unit 100. For example, the lens CPU 210 may receive digital information obtained by converting positional information regarding the zoom lens 202 and the focus lens 206, analyze the digital information, determine positions of the zoom lens 202 and the focus lens 206, and transmit the positional information to the main body unit 100. Also, when the lens CPU 210 receives a command to designate positions or values of the zoom lens 202, the iris 204, and the focus lens 206, the CPU 210 may designate the positions or values of the zoom lens 202, the iris 204, and the focus lens 206.

The lens CPU 210 may include an SIO 211 that may communicate with the SIO 153 included in the DSP/CPU 110 of the main body unit 100 to enable communication between the main body unit 100 and the lens unit 200.

The ROM 212 may be used to store a computer program sequentially readable and executable by the lens CPU 210 to control operation of the lens unit 200, or various settings (e.g., a classification number or serial number of a lens) of the lens unit 200. Also, the RAM 214 may be used to store rewritable information to enable operation of the lens unit 200.

The drivers 216 and 218 may control driving of the motors 220 and 222 for operating the iris 204 and the focus lens 206, respectively. By operating the iris 204 and the focus lens 206 via the drivers 216 and 218, a size of a subject, a light quantity, and a focus may be controlled.

Hereinbefore, a function configuration of the imaging device 10 according to an embodiment is described with reference to FIG. 1. Hereinafter, operation of the imaging device 10 according to the present embodiment will be described.

[1-2. Operation of Imaging Device]

The imaging device 10 according to the present embodiment may include an automatic scene-mode selection function. The imaging device 10 may determine a scene mode by referencing values of characteristics of a subject, for example, a luminance, a color gradient, and an imaging distance. For example, when a luminance of an image is a predetermined value or higher, a scene may be determined to be an outdoor scene. Also, when an imaging distance is not a relatively close distance, the imaging device 10 may select a landscape mode as a candidate for a scene mode in consideration of a luminance and the imaging distance.

In addition to values of characteristics of a subject, lens characteristics of the lens unit 200 mounted on the main body unit 100 may be considered to determine a scene mode. For example, when the lens unit 200 is a telephoto lens, a sports mode in which an image of a subject is to be captured while it is difficult to access the imaging device 10 or a portrait mode in which an image of a subject is to be captured while a background is blurry may be a strong candidate for a scene mode, whereas a candle mode in which it is assumed that an indoor scene is to be captured may be regarded as being outside a range of selectable scene modes.

As described above, a scene mode may be determined by referencing the lens characteristics of the lens unit 200 mounted on the main body unit 100 as a significant factor. Also, in a specific example, when the lens unit 200 includes a macro photography button and a photographer manipulates the macro photography button to determine a macro setting, a scene mode may be limited to a close-up mode.

Furthermore, when the imaging device 10 is a lens-integral-type imaging device, lens characteristics of a lens of the imaging device 10 may be uniformly determined. By comparison, when the imaging device 10 is a lens-exchangeable imaging device, for example, a single-lens still camera, even the same subject may be recognized in different scene modes according to a lens mounted on the main body unit 100.

Here, selection of scene modes in consideration of lens characteristics is exemplified in Table 1.

TABLE 1

An example of selection of scene modes in consideration of lens characteristics

| | Mode | | | | | |
|---|---|---|---|---|---|---|
| Lens | Portrait (P) | Landscape (L) | Close-up (C) | Sports (S) | Memorial picture (M) | Candle (Cd) |
| Fisheye lens | | ○ | ○ | | ○ | |
| Macro lens | ○ | | ○ | | | |
| Wide-angle zoom lens | ○ | ○ | ○ | | ○ | ○ |
| Standard zoom lens | ○ | ○ | ○ | ○ | ○ | ○ |
| Telephoto lens | ○ | ○ | | ○ | | |

As stated above, photographers who have complaints about recognition results or processing contents of scene modes of automatic scene-mode selection function may intend to select a scene mode by manual manipulation. In this case, as long as only scene modes appropriate for the lens characteristics of the lens unit 200 mounted on the main body unit 100 of the imaging device 10 are previously chosen, convenience of manual selection of a scene mode may be increased.

Furthermore, in recent years, there have been a relatively great number of imaging devices including user interfaces on touch panels by which users may directly contact display units of the imaging devices to manipulate the imaging devices. In such an imaging device, an automatically chosen scene mode appropriate for lens characteristics may be displayed on an entire display screen during a scene-mode selection operation.

Figure 2A:
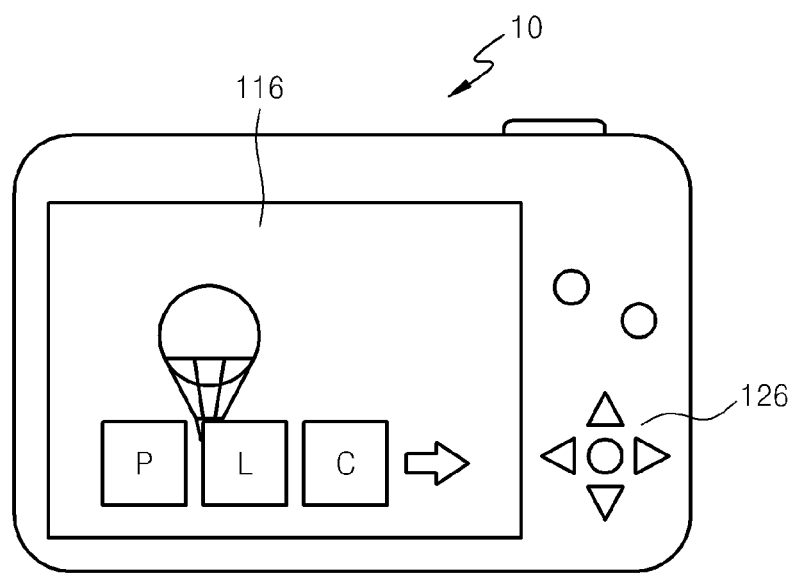
FIGS. 2A and 2B are diagrams for explaining a screen displayed on a display unit when the lens unit is mounted on the main body unit of the imaging device and when the lens unit includes a wide-angle zoom lens, according to an exemplary embodiment.
Figure 2B:
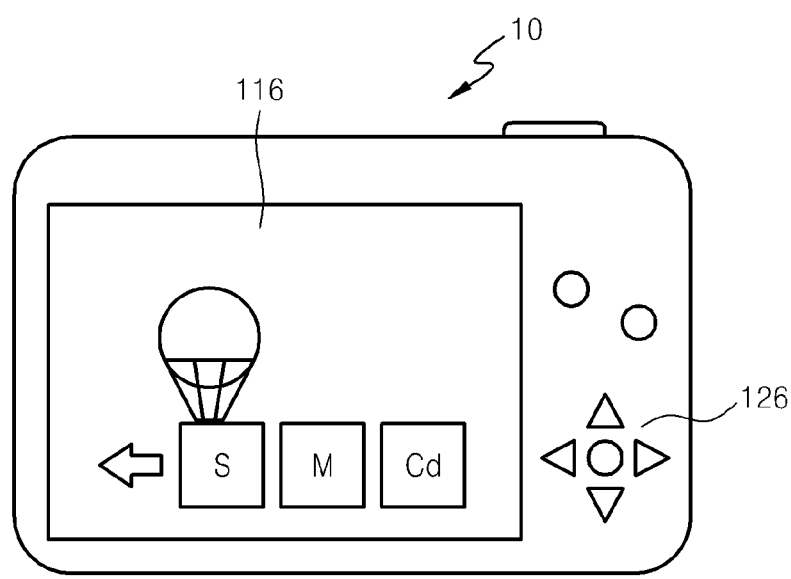

FIGS. 2A and 2B are diagrams for explaining a screen displayed on the display unit 116 when the lens unit 200 includes a wide-angle zoom lens and the lens unit 200 is mounted on the main body unit 100 of the imaging device 10, according to an exemplary embodiment. In FIGS. 2A and 2B, the lens characteristics shown in Table 1 are not considered, and thus all of a plurality of scene modes may be displayed on the display unit 116.

Figure 3A:
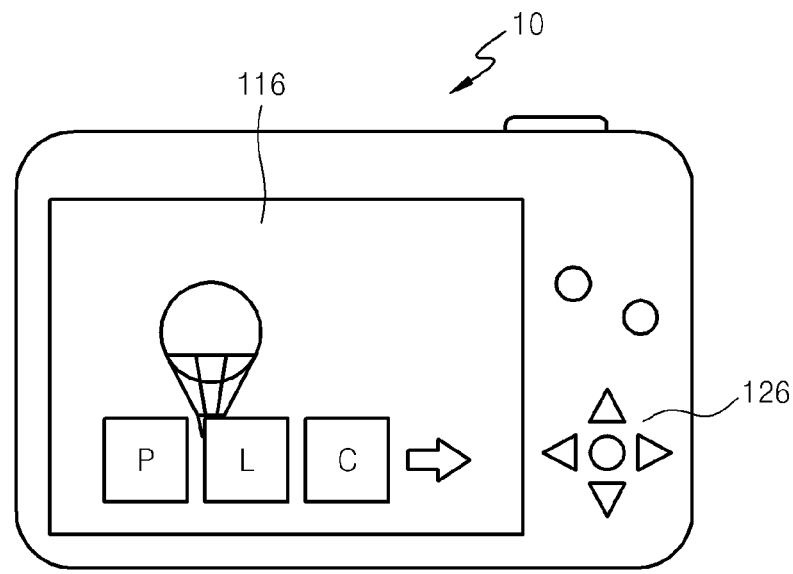
FIGS. 3A and 3B are diagrams for explaining a screen displayed on a display unit when the lens unit is mounted on the main body unit of the imaging device and when the lens unit includes a wide-angle zoom lens, according to another exemplary embodiment.
Figure 3B:
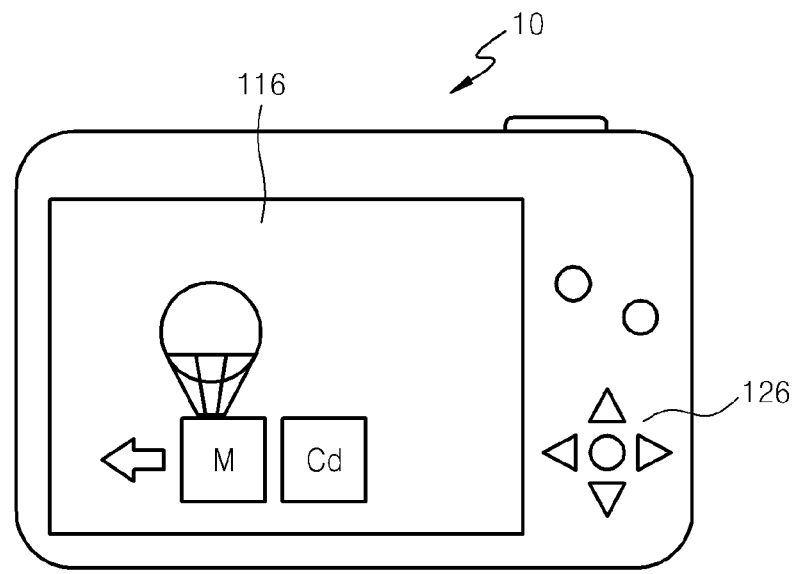

However, when the lens characteristics shown in Table 1 are considered, only selectable scene modes may be displayed on the display unit 116. FIGS. 3A and 3B are diagrams for explaining a screen displayed on the display unit 116 when the lens unit 200 is mounted on the main body unit 100 of the imaging device 10 and when the lens unit 200 includes a wide-angle zoom lens, according to another exemplary embodiment.

In FIGS. 3A and 3B, only selectable scene modes are displayed on the display unit 116 in consideration of the lens characteristics of Table 1. Referring to Table 1, when the lens unit 200 includes a wide-angle zoom lens, the sports (S) mode may be outside a range of the selectable scene modes. Accordingly, as shown in FIG. 3B, the sports (S) mode may not be displayed on the display unit 116.

As described above, although only selectable scene modes may be displayed on the display unit 116 in consideration of the lens characteristics shown in Table 1, a manipulation screen may still cover two screens. Thus, if a photographer may delete an uninteresting scene mode, a setting screen may be simply constructed for a next time.

For example, when the lens unit 200 includes a wide-angle zoom lens, a photographer may determine that the close-up and candle scene modes are unnecessary. In this case, the photographer may perform a predetermined manipulation operation on the imaging device 10 and designate the close-up and candle scene modes as being outside a range of selectable scene modes.

Figure 4:
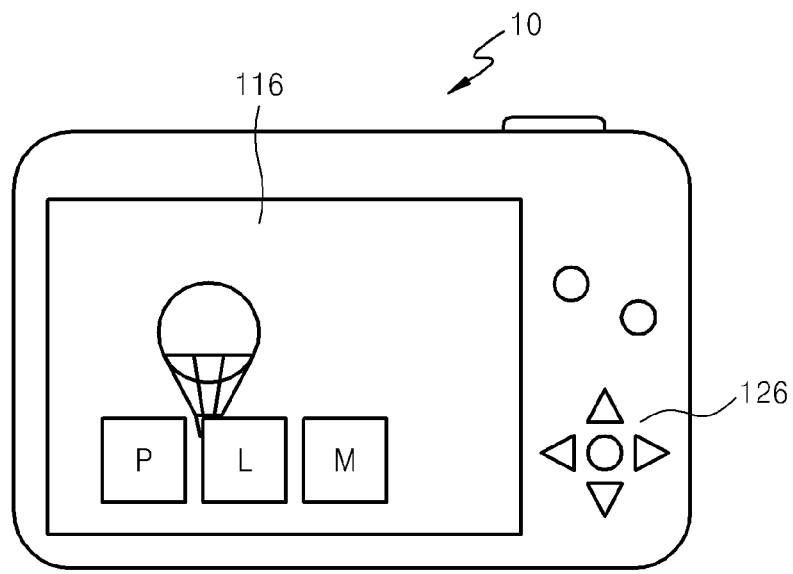
FIG. 4 is a diagram for explaining a screen displayed on a display unit when the lens unit is mounted on the main body unit of the imaging device and when the lens unit includes a wide-angle zoom lens, according to another exemplary embodiment.

FIG. 4 is a diagram for explaining a screen displayed on the display unit 116 when the lens unit 200 is mounted on the main body unit 100 of the imaging device 10 and the lens unit 200 includes a wide-angle zoom lens, according to another exemplary embodiment. In FIG. 4, only selectable scene modes other than the close-up and candle modes are displayed on the display unit 116 when the close-up mode and the candle mode are deleted from a selection sheet by a photographer in consideration of the lens characteristics of Table 1.

Thus, when the close-up mode and the candle mode are deleted from a selection sheet by a photographer in consideration of the lens characteristics of Table 1, a setting screen may take up only one screen, and convenience of selection of a scene mode may be increased, thereby reducing time taken to select a scene mode.

In addition, not only deleting unnecessary scene modes but also adding scene modes regarded as necessary by a photographer may be performed in scene mode. For instance, when the lens unit 200 includes a wide-angle zoom lens and is mounted on the main body unit 100 of the imaging device 10, the sports (S) mode may be outside a range of selectable scene modes in consideration of the lens characteristics shown in Table 1. However, even if the wide-angle zoom lens is mounted, photographers may intend to select a scene mode not in the range of the selectable scene modes. Accordingly, when the wide-angle zoom lens is mounted on the main body unit 100 of the imaging device 10, the sports (S) mode may be set to be within the range of the selectable scene modes using a predetermined manipulation operation. Also, for example, when a photographer wants to use a fisheye lens indoors and intends to add the candle mode, which is excluded from a range of selectable scene modes in consideration of the lens characteristics of Table 1, to a selection sheet, the candle (Cd) may be set to be within the range of the selectable scene modes using a predetermined manipulation operation.

Figure 5:
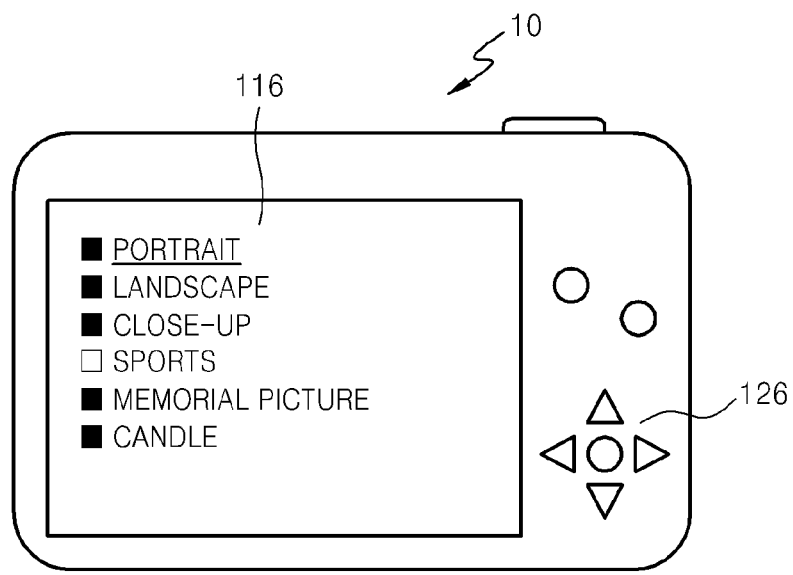
FIG. 5 is a diagram for explaining a screen displayed on a display unit, according to another exemplary embodiment.
Figure 6:
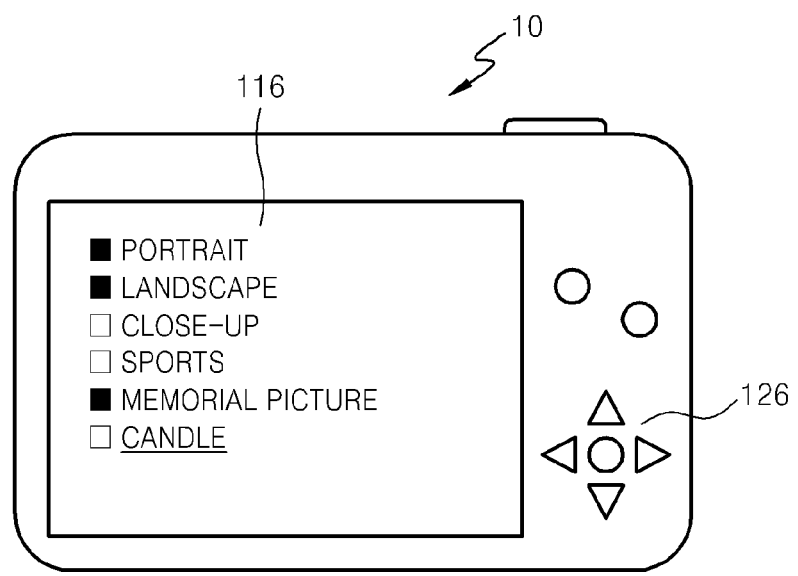
FIG. 6 is a diagram for explaining a screen displayed on a display unit, according to another exemplary embodiment.

FIGS. 5 and 6 are diagrams for explaining screens displayed on the display unit 116, according to other exemplary embodiments. FIGS. 5 and 6 show manipulation screens during addition and deletion of scene modes. Setting screens of FIGS. 5 and 6 may be displayed on the display unit 116, for example, when a photographer performs a predetermined manipulation operation on the manipulator 126.

FIG. 5 shows fundamental settings when the lens unit 200 including a wide-angle zoom lens is mounted on the main body unit 100 of the imaging device 10. In FIG. 5, the portrait mode, the landscape mode, the close-up mode, a memorial picture mode, and the candle mode may be marked as selection candidates, while the sports mode may not be marked as a selection candidate.

Here, when a photographer determines that the marked close-up and candle modes are unnecessary, the photographer may manipulate the manipulator 126 and make the close-up and candle modes unmarked. FIG. 6 shows the unmarked close-up and candle modes due to the photographer's manipulation of the manipulator 126, unlike the display unit 116 of FIG. 5. The imaging device 10 may detect the unmarked close-up and candle modes and omit the unmarked close-up and candle modes from a next manual selection screen.

In addition, when a photographer intends to add the unmarked sports modes to selectable scene modes, the photographer may manipulate the manipulator 126 and mark the sports mode. The imaging device 10 may detect the marked sports mode and display the newly marked sports mode on a next manual selection screen.

As stated above, a photographer may add or delete at least one of scene modes presented by the imaging device 10. The imaging device 10 may attach information regarding scene modes added or deleted by the photographer to ID information indicating the classification of the lens unit 200 mounted on the main body unit 100 and record the information in the main body unit 100, for example, in the nonvolatile memory 108. By attaching the information regarding the added or deleted scene modes to the ID information indicating the classification of the lens unit 200 mounted on the main body unit 100 and writing the information, even if the imaging device 10 is turned off and then turned on again or even if the corresponding lens unit 200 is exchanged for another lens unit 200 and then mounted again, the imaging device 10 may still provide setting contents set by the photographer.

Furthermore, although not attached to the ID information indicating the classification of the lens unit 200, the information regarding the scene modes added or deleted by a photographer may be attached to the serial number of the lens unit 200 and recorded in the main body unit 100. By attaching the information regarding the added or deleted scene modes to the serial number of the lens unit 200 and writing the information in the main body unit 100, the photographer may designate the corresponding lens unit 200 and record customized contents of only the corresponding lens unit 200 even if the corresponding lens unit 200 has the same classification as other lens units.

In addition, when the lens unit 200 mounted on the main body unit 100 has a zoom function, the lens unit 200 may have characteristics of both a wide-angle lens and a telephoto lens. A photographer may manually select a different scene mode according to a zoom state (or focal distance) of a lens, even if the lens is not exchanged for another lens. Accordingly, zoom information (or information regarding a focal distance) obtained during a set operation may be attached to the ID information indicating the classification of the lens unit 200. In this case, contents displayed on a scene-mode manipulation screen may be interlocked with a zoom position during a screen switch operation.

As described above, selectable scene modes depending on the lens unit 200 mounted on the main body unit 100 may be customized by a photographer. However, it is possible that the main body unit 100 may return to a setting of a previously prepared default scene mode due to a photographer's manipulation.

In addition, the above-described manipulations may be performed on the mode determiner 160 included in the DSP/CPU 110. The mode determiner 160 may extract an appropriate scene mode based on the characteristics of the lens unit 200 mounted on the main body unit 100 or the ID information indicating the classification of the lens unit 200, and display the scene mode on the display unit or store a scene mode set by a photographer in the nonvolatile memory 108 so that selectable scene modes can be customized depending on the lens unit 200 mounted on the main body unit 100.

Here, examples of data recorded in the nonvolatile memory 108 in connection with a lens will be described. To begin with, each of scene modes may be allocated to bits. For example, each of the scene modes may be allocated to bits according to the following scene mode index table.

TABLE 2

An example of bits allocated to each of the scene modes

| Scene Mode | Allocated Bits |
| --- | --- |
| Portrait | :0x0001 |
| Landscape | :0x0002 |
| Close-up | :0x0004 |
| Sports | :0x0008 |
| Memorial picture | :0x0010 |
| Candle | :0x0020 |

For example, when a lens is mounted on the main body unit 100 and selectable scene modes are the portrait, landscape, and memorial picture modes, data recorded in connection with the lens may be 0x0013. Data regarding the selectable scene modes recorded in connection with the lens may be referred to as scene mode index information.

When the lens unit 200 includes a wide-angle end focal lens, data may be recorded in the nonvolatile memory 108, for example, as shown in Table 3.

TABLE 3

An example of data stored in regard to a wide-angle end focal lens

| Lens ID number | Focal distance [mm] | Index information regarding selectable scene modes |
|---|---|---|
| AAA012345678BB18 | 18 | 0x0037 |

Referring to Table 3, it can be seen that an index information that five scene modes except the sports mode out of the six scene modes may be used may be attached to a lens ID number including the serial number of the lens unit 200 and a focal-distance threshold value (mm). Here, when a photographer deletes the candle mode from selectable scene modes, index information regarding the selectable scene modes may be changed into 0x0017 and recorded in the nonvolatile memory 108.

In the imaging device 10, a plurality of pieces of scene mode index information may be recorded in the nonvolatile memory 108, for example, according to a focal distance of the zoom lens 202. The following Table 4 shows examples of scene mode indices recorded in the nonvolatile memory 108 when the standard zoom lens shown in Table 1 is mounted on the main body unit 100.

TABLE 4

An example of data stored in regard to a standard zoom lens

| Lens ID number | Focal distance [mm] | Index information regarding selectable scene modes |
|---|---|---|
| ZZZ012345678XX18 | 18 | 0x003f |
| ZZZ012345678XX30 | 30 | 0x003f |
| ZZZ012345678XX55 | 55 | 0x003f |

Referring to Table 4, when the focus lens 206 of the lens unit 200 has a focal distance of about 18 to about 30 mm, the mode determiner 160 may refer to scene mode index information in a first row, when the focus lens 206 of the lens unit 200 has a focal distance ranging from about 30 to about 55 mm, the mode determiner 160 may refer to scene mode index information in a second row, and when the focus lens 206 of the lens unit 200 has a focal distance of more than about 55 mm, the mode determiner 160 may refer to scene mode index information in a third row.

Here, when a photographer moves the focus lens 206 of the lens unit 200 to obtain a focal distance of about 55 mm and deletes the candle mode from selectable scene modes, scene mode index information as shown in Table 5 may be obtained.

TABLE 5

An example of data stored in regard to a standard zoom lens

| Lens ID number | Focal distance [mm] | Index information regarding selectable scene mode |
|---|---|---|
| ZZZ012345678XX18 | 18 | 0x003f |
| ZZZ012345678XX30 | 30 | 0x003f |
| ZZZ012345678XX55 | 55 | 0x001f |

Thus, even when a serial number of a lens, for example, a zoom lens or focus lens, of the mounted lens unit 200 is unchanged, the imaging device 10 according to an embodiment may set different scene-mode index information according to a set state of the lens, for example a state of the zoom lens 202 or the focus lens 206, and record the set scene-mode index information in the nonvolatile memory 108.

Figure 7:
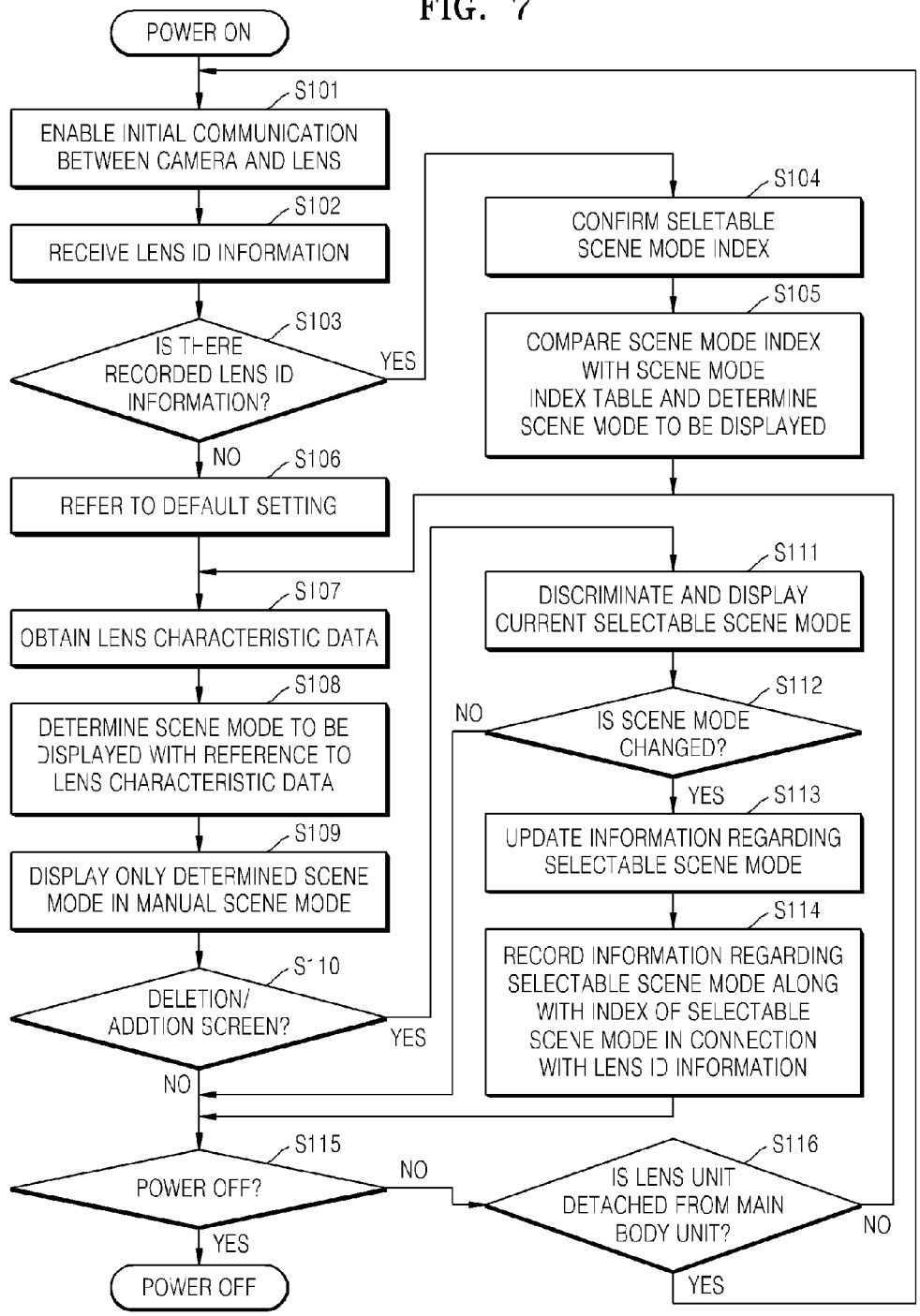
FIG. 7 is a flowchart illustrating operations of an imaging device, according to an exemplary embodiment.

FIG. 7 is a flowchart illustrating operations of the imaging device 10, according to an exemplary embodiment. Hereinafter, the operations of the imaging device 10 according to the present embodiment will be described with reference to FIG. 7.

When the imaging device 10 is turned on, the imaging device 10 may enable initial communication between the main body unit 100 and the lens unit 200 (operation S101). The initial communication between the main body unit 100 and the lens unit 200 may be enabled between the SIO 153 of the main body unit 100 and the SIO 211 of the lens unit 200. The lens unit 200 may transmit its lens identification (ID) information, focus length information, iris information, and positional information of the focus lens 206 to the main body unit 100. Also, during the initial communication between the main body unit 100 and the lens unit 200, the lens ID information transmitted from the lens unit 200 may include, for example, a type or a serial number of a lens. Also, in the present embodiment, the lens ID information and the iris information may be communicated at a time when the imaging device 10 is turned on or the lens unit 200 is mounted on the main body unit 100.

When the initial communication between the main body unit 100 and the lens unit 200 is performed in operation S101, the main body unit 100 may obtain the lens ID information of the lens unit 200 (operation S102). The lens ID information of the lens unit 200 may be stored in, for example, the ROM 212 of the lens unit 200 and read by the lens CPU 210 and transmitted to the main body unit 100 when the initial communication between the main body unit 100 and the lens unit 200 is performed.

When the main body 100 obtains the lens ID information of the lens unit 200 in operation S102, the main body unit 100 may determine whether the lens ID information of the lens unit 200 obtained in operation S102 is already recorded in the main body unit 100 (operation S103). The determination may be performed by, for example, the mode determiner 160.

When it is determined that the lens ID information of the lens 200 obtained in operation S102 is already recorded in the main body unit 100, the main body unit 100 may confirm a selectable scene mode index based on the lens ID information of the mounted lens unit 200 (operation S104). The confirmation of the selectable scene mode index may be performed by, for example, the mode determiner 160. Also, when the selectable scene mode index is confirmed based on the lens ID information of the mounted lens unit 200 in operation S104, the main body unit 100 may compare the scene mode index with a scene mode index table shown in, for example, Table 1, and determine scene modes to be displayed on the display unit 116 (operation S105). The determination of the scene modes to be displayed on the display unit 116 may be performed by, for example, the mode determiner 160.

Meanwhile, when it is determined that the lens ID information of the lens unit 200 obtained in operation S102 is not already recorded in the main body unit 100, the main body unit 100 may refer to a setting of a default scene mode (operation S106). The referring to the setting of a default scene mode may be performed by, for example, the mode determiner 160. Also, the setting of the default scene mode may be stored in, for example, the nonvolatile memory 108.

Thereafter, the main body unit 100 may obtain lens characteristic data due to the initial communication between the main body unit 100 and the lens unit 200 performed in operation S101 (operation S107) and determine the scene modes to be displayed on the display unit 116 with reference to the obtained lens characteristic data (operation S108). The determination of the scene modes to be displayed on the display unit 116 may be performed by, for example, the mode determiner 160.

When the scene modes to be displayed on the display unit 116 are determined with reference to the lens characteristic data obtained due the initial communication, the main body unit 100 may display only scene modes manually selected by a photographer from among the scene modes determined in operation S108 (operation S109). The display of the scene modes on the display unit 116 may be performed by, for example, the GUI manager 159.

When the main body unit 100 displays only the scene modes determined in operation S108 on the display unit 116 in operation S109, the main body unit 100 may determine whether a screen for deletion/addition of scene modes is called by the photographer (operation S110). The determination of whether the deletion/addition screen is called by the photographer may be performed by, for example, the GUI manager 159.

When it is determined in operation S110 that the deletion/addition screen is called by the photographer, the main body unit 100 may discriminate current selectable scene modes and display the current selectable scene modes on the display unit 116 (operation S111). The screen displayed on the display unit 116 in operation S111 may be the same as shown in FIGS. 5 and 6.

When the main body unit 100 displays the selectable scene modes on the display unit 116 in operation S111, the main body unit 100 may determine whether a change of scene modes is conducted by the photographer (operation S112). The determination of whether a change of scene modes is conducted may be performed by, for example, the GUI manager 159.

When it is determined in operation S112 that a change of scene modes is conducted by the photographer, the main body unit 100 may update information regarding the selectable scene modes (operation S113). The updating of the selectable scene modes may be performed by, for example, the mode determiner 160. By the updating of the selectable scene modes, for example, scene-mode index information stored in the nonvolatile memory 108 may be updated. Meanwhile, as the result of operation S110, when it is determined that a change of scene modes is conducted by the photographer, the main body unit 100 may not perform any operation.

Thereafter, index information of the selectable scene modes may be recorded in the main body unit 100, attaching to the lens ID of the lens unit 200 (operation S114). The recording of the index information of the selectable scene modes in the nonvolatile memory 108 may be executed by, for example, the mode determiner 160.

Afterwards, the main body unit 100 may determine whether the imaging device 10 is to be turned off by the photographer (operation S115). When the imaging device 10 is not turned off in operation S115, the main body unit 100 may determine whether the lens unit 200 is detached from the main body unit 100 (operation S116). The determination of whether the lens unit 200 is detached from the main body 100 may be performed by the DSP/CPU 110.

When it is determined that the lens unit 200 is detached from the main body unit 100 in operation S116, the process may return to operation S101 so that the main body unit 100 may execute initial communication with the lens unit 200. Meanwhile, when it is determined that the lens unit 200 is not detached from the main body unit 100 in operation S116, the process may return to operation S107 and the main body unit 100 may determine scene modes to be displayed on the display unit 116 with reference to the lens characteristic data obtained due to the initial communication between the main body unit 100 and the lens unit 200.

Meanwhile, when it is determined that the imaging device 10 is to be turned off in operation S115, the imaging device 10 may be turned off.

By performing the series of processing operations shown in FIG. 7, the imaging device 10 according to one embodiment may be capable of presenting only scene modes based on the lens characteristics of the lens unit 200 mounted on the main body unit 100 to a photographer and simultaneously allowing the photographer to add scene modes or delete the presented scene modes.

Although the customization of scene modes prepared in the imaging device 10 is described thus far, imaging modes that may be customized according to the embodiments are not limited to the scene modes. For example, an imaging mode of changing a focus driving range may also be customized.

Figure 8:
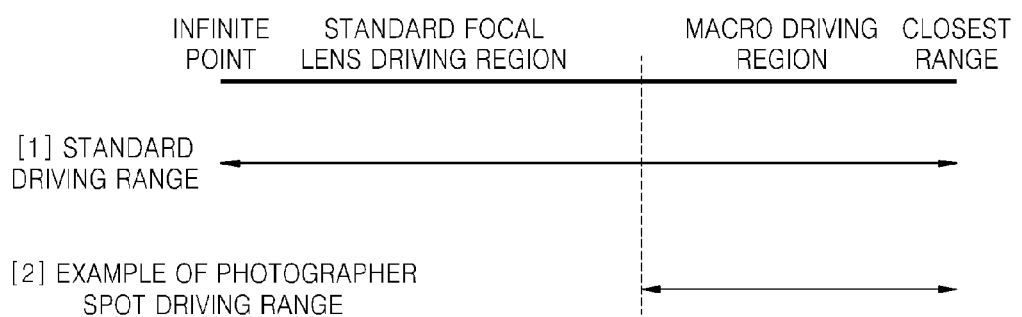
FIG. 8 is a diagram for explaining a lens driving range of a macro lens, according to an exemplary embodiment.

For example, a forwarding amount of a macro lens may be longer than that of a standard lens to increase an imaging magnification. Accordingly, when an AF driving operation is performed within an entire focus controllable range, it may take a relatively great amount of time to enable in-focus processing. FIG. 8 is a diagram for explaining a lens driving range of the macro lens, according to an exemplary embodiment. When a default scene mode is set, since the macro lens is driven from an infinite point to a closest range during an AF operation, it may take quite a long time to enable in-focus processing.

Thus, according to a method of operating the imaging device 10 by a photographer, a customization function that selects only a macro driving region or a standard-lens driving region, as shown in FIG. 8, may be used. By restricting a lens driving region, in-focus processing may be performed more quickly during an AF operation.

Figure 9:
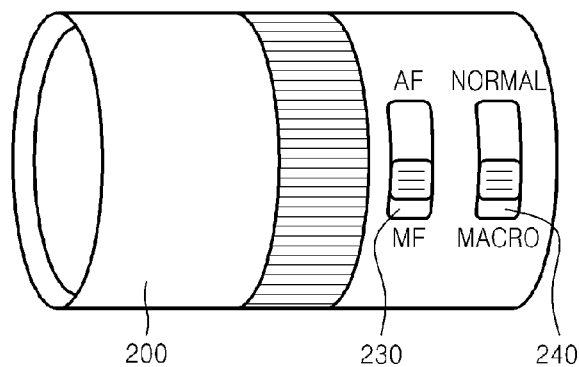
FIG. 9 is an exterior view of a lens unit, according to an exemplary embodiment.

FIG. 9 is an exterior view of a lens unit, according to an exemplary embodiment. As shown in FIG. 9, some lenses may include an AF/MF switch unit 230 allowing a photographer to switch between an AF operation and an MF operation, and a macro switch 240 allowing the photographer to switch between an ordinary imaging mode and a macro imaging mode. In general, the main body unit 100 also may set AF/MF or macro state. However, when the AF/MF switch unit 230 or the macro switch unit 240 has a slide switch shape as shown in FIG. 9, a photographer can identify the setting states from outside appearance. Thus, the AF/MF setting or the macro setting of the AF/MF switch unit 230 or the macro switch unit 240 of the lens unit 200 may be determined before anything else.

However, even if an AF or MF operation is typically performed due to the setting of the AF/MF switch unit 230 of the lens unit 200, a photographer's demand that an AF operation should be always set in a specific scene mode, for example, in the sports mode, may be considered. Accordingly, the imaging device 10 may conform to the setting of the AF/MF switch unit 230 as a default setting, while a photographer may customize a setting and designate a specific operation to always enable an AF or MF operation without regard for the setting of the AF/MF switch unit 230. Similarly, the imaging device 10 may conform to the setting of the macro switch unit 240 as a default setting, while the photographer may customize a setting and define a lens driving region without regard for the setting of the macro switch unit 240.

2. Conclusion

As explained thus far, the imaging device 10 according to one embodiment may read settings of imaging modes recorded in the main body unit 100 and present the settings of the imaging modes according to lens characteristics of the lens unit 200 mounted on the main body unit 100. Also, the imaging device 10 may allow a photographer to edit the imaging modes presented to the photographer. Thus, the imaging device 10 may determine an imaging mode suitable for a photographer's taste and record the imaging mode therein according to the lens unit 200 mounted on the main body unit 100.

Settings of imaging modes recorded on the main body unit 100 may include, for example, setting of a scene mode or setting of a focus driving range. With regard to the setting of the scene mode, a photographer may edit imaging modes presented by the imaging device 10 on the display unit 116 according to lens characteristics. Thus, the imaging device 10 may be capable of presenting appropriate scene modes according to the characteristics of the lens unit 200 mounted on the main body unit 100 or according to a photographer's taste.

As described above, a new, improved imaging device, method of selecting an imaging mode, and recording medium configured to store a computer program according to various embodiments can present selectable imaging modes according to characteristics of a mounted lens and select an imaging mode with reference to the characteristics of the mounted lens.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An imaging device including a plurality of imaging modes appropriate for capturing an image of a subject, comprising:

an imaging mode determiner configured to determine one or more selectable imaging modes during mounting of a lens out of the plurality of imaging modes according to lens characteristics of the mounted lens; and an imaging mode presenter configured to present the one or more selectable imaging modes determined by the imaging mode determiner on a screen, wherein one selected imaging mode among the one or more selectable imaging modes is selected during a scene-mode selection operation in response to a selection signal.

2. The device of claim 1, wherein the lens is exchangeable, and the imaging mode determiner obtains the lens characteristics of the mounted lens, discriminates the mounted lens from other lenses, and determines the one or more selectable imaging modes.

3. The device of claim 1, further comprising a memory unit configured to store information for uniquely discriminating the mounted lens and the one or more selectable imaging modes corresponding to the information.

4. The device of claim 3, wherein the information for uniquely discriminating the mounted lens comprises at least one piece of information for each of a plurality of lenses.

5. The device of claim 3, wherein the information for uniquely discriminating the mounted lens is a serial number.

6. The device of claim 5, wherein even if a lens having the same classification as other lenses is mounted, the imaging mode determiner varies the one or more selectable imaging modes based on a difference in the information for uniquely discriminating the mounted lens.

7. The device of claim 1, wherein the one or more selectable imaging modes includes a scene mode in which an image of the subject is captured.

8. The device of claim 1, wherein the one or more selectable imaging modes includes a mode of switching a focus-lens driving range of the lens.

9. The device of claim 1, wherein the one or more selectable imaging modes includes a focus mode of switching between auto focusing and manual focusing.

10. The device of claim 1, wherein the lens characteristics include at least one of a classification of the lens, information regarding a focal distance, information regarding a distance to a subject, and information regarding a specific-operation switch unit.

11. The device of claim 1, wherein the imaging mode determiner adds a selectable imaging mode or deletes at least one of the determined one or more selectable imaging modes in response to a command to add a selectable imaging mode or delete at least one of the determined one or more selectable imaging modes.

12. The device of claim 1, wherein the one or more selectable imaging modes are at least two selectable imaging modes.

13. A method of selecting an imaging mode of an imaging device including a plurality of imaging modes appropriate for capturing an image of a subject, the method comprising:
   determining one or more selectable imaging modes out of the plurality of imaging modes according to lens characteristics of a mounted lens; and
   presenting the determined one or more selectable imaging modes on a screen wherein one selected imaging mode among the one or more selectable imaging modes is selected during a scene-mode selection operation in response to a selection signal.

14. The method of claim 13, further comprising adding a selectable imaging mode to the presented one or more selectable imaging modes or deleting one or more selectable imaging modes from the presented one or more selectable imaging modes in response to an imaging mode addition or deletion command.

15. The method of claim 13, wherein the one or more selectable imaging modes are at least two selectable imaging modes.

16. The method of claim 13, further comprising selecting one selected imaging mode among the one or more selectable imaging modes during a scene-mode selection operation in response to a selection signal.

17. A non-transitory recording medium on which a computer program executable by a processor for performing a method of selecting an imaging mode of an imaging device including a plurality of imaging modes appropriate for capturing an image of a subject is stored, the method comprising:
   determining one or more selectable imaging modes out of the plurality of imaging modes according to lens characteristics of a mounted lens; and
   presenting the determined one or more selectable imaging modes on a screen,
   wherein one selected imaging mode among the one or more selectable imaging modes is selected during a scene-mode selection operation in response to a selection signal.

18. The recording medium of claim 17, wherein the method further comprises adding a selectable imaging mode or deleting one or more selectable imaging modes.

19. The recording medium of claim 17, wherein the one or more selectable imaging modes are at least two selectable imaging modes, and the method further comprises selecting one selected imaging mode among the one or more selectable imaging modes during a scene-mode selection operation in response to a selection signal.

20. An imaging device including a plurality of imaging modes appropriate for capturing an image of a subject, comprising:
   an imaging mode determiner configured to determine one or more selectable imaging modes during mounting of a lens out of the plurality of imaging modes according to lens characteristics of the mounted lens;
   an imaging mode presenter configured to present the one or more selectable imaging modes determined by the imaging mode determiner on a screen; and
   a memory unit configured to store information for uniquely discriminating the mounted lens and the one or more selectable imaging modes corresponding to the information,
   wherein the information for uniquely discriminating the mounted lens is a serial number, and
   wherein even if a lens having the same classification as other lenses is mounted, the imaging mode determiner varies the one or more selectable imaging modes based on a difference in the information for uniquely discriminating the mounted lens.

* * * * *